United States Patent Office 3,414,973
Patented Dec. 10, 1968

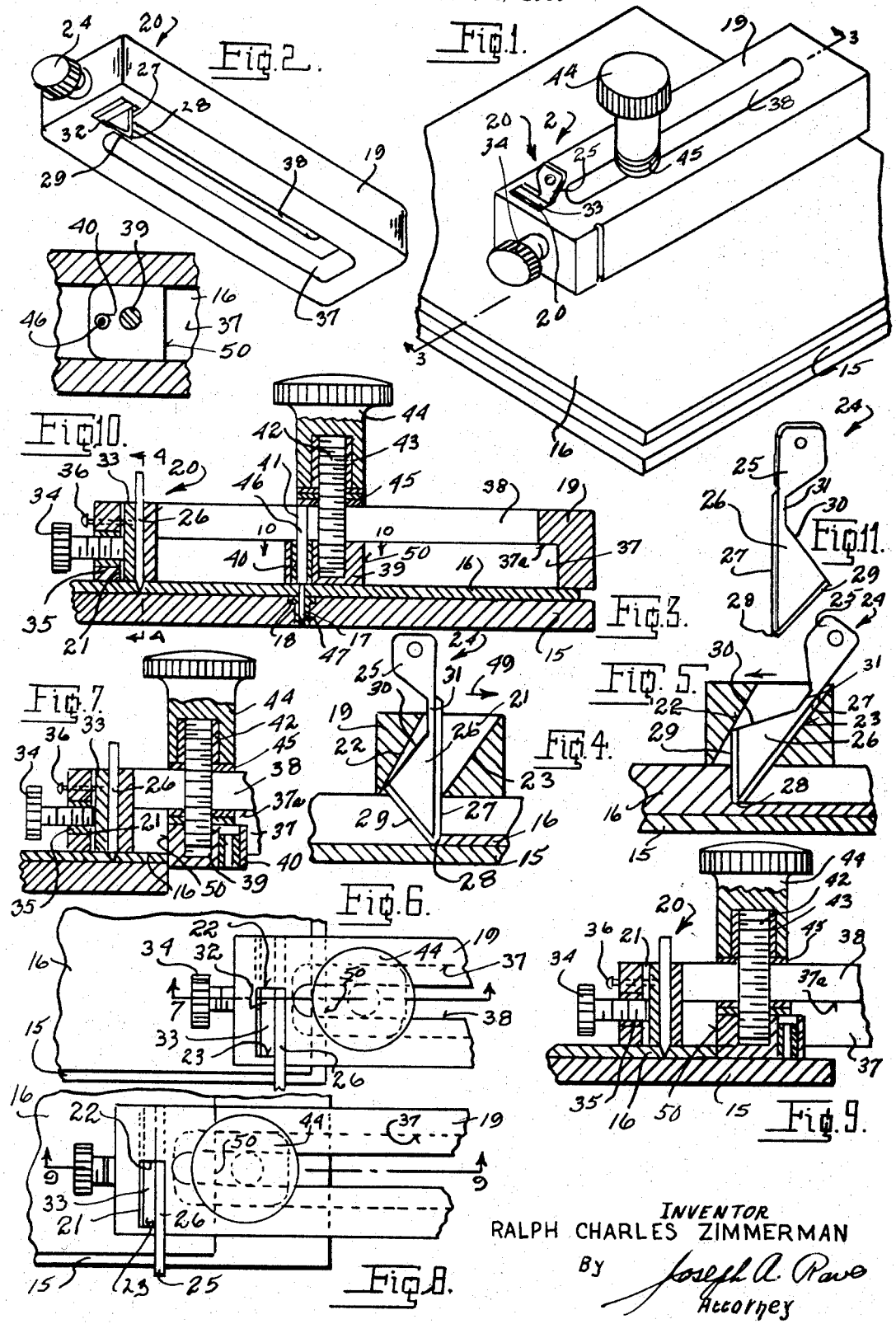

3,414,973
CUTTING TOOL
Ralph Charles Zimmerman, Cincinnati, Ohio, assignor to The Zimmerman Packing Company, Cincinnati, Ohio, a corporation of Ohio
Filed June 6, 1966, Ser. No. 560,955
4 Claims. (Cl. 30—293)

ABSTRACT OF THE DISCLOSURE

This cutting tool is adapted to be used in cutting circles and strips from flat materials such as paper, gasket material, fiber glass, and in fact any material when in a flat or sheet condition and capable of cutting by a steel blade keen edge. The cutter blade of this hand tool is provided with, in effect, angularly related cutting keen edges so that the cutting of the flat material may be effected when the cutter body member is actuated in either direction.

Summary of the invention

This invention relates to improvements in hand tools adapted for cutting circles, strips with parallel edges, whether straight or irregular, and for hand following irregular lines. The invention further contemplates use of a cutter blade capable of cutting in opposite directions to produce clear and clean cuts.

An object of the present invention is, therefore, the provision of a hand or manually actuatable tool capable of cutting in opposite directions without changing the cutter blade relative to the body once the said cutter blade and body are connected or associated with one another.

Another object of this invention is the provision of a cutting blade having a keen edge on each side whereby the blade is usable for cutting purposes when moved in opposite directions.

A still further object of the present invention is the provision of a hand tool with a cutting blade and which may be secured in position to cut to a given depth when moved in one direction and will, automatically, cut to a deeper depth when actuated in the reverse direction.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a perspective view of the hand tool of the present invention mounted with respect to the work and a supporting member for cutting circles.

FIG. 2 is a perspective view, per se, of the underside of the cutting tool, per se.

FIG. 3 is a longitudinal sectional view through the tool as illustrated in FIG. 1 and as seen from line 3—3 on said FIG. 1.

FIG. 4 is a transverse sectional view through the cutter body adjacent the cutting blade illustrating the relative position of the blade to the body when moving in a given longitudinal direction or when moving in a given direction around a centering pin.

FIG. 5 is a sectional view similar to FIG. 4 illustrating the relation of the cutter blade and body when actuated in the opposite direction from that of FIG. 4.

FIG. 6 is a top plan view of the cutting end of the tool illustrating same as utilizing the edge of the material supporting board for the guide in cutting a strip.

FIG. 7 is a fragmentary sectional view through the cutting end of the tool, as seen from line 7—7 on FIG. 6.

FIG. 8 is a top plan view of the cutting end of the tool, similar to that illustrated in FIG. 6, except that in this view use is made of the edge of the material itself as the guide for the cutting of the strip.

FIG. 9 is a longitudinal sectional view through the cutting end of the tool as seen from line 9—9 on FIG. 8.

FIG. 10 is a top plan view of a portion of the hand tool as seen particularly from line 10—10 on FIG. 3.

FIG. 11 is a perspective view of the cutting blade as utilized in carrying forward the functions of the tool of the present invention.

Throughout the several views of the drawings similar reference characters are employed to denote the same or similar parts.

The hand tool in its overall aspects is not primarily new and is an improvement on the said tool as disclosed in the prior United States Patent No. 2,880,506. This prior tool includes substantially the same parts as that herein set forth except that the blade, per se, differs and wherefore the tool as herein disclosed may be operated in reverse directions without first dismanteling the blade from the tool body and subsequently either reversing the blade or obtaining a different blade for actuation or operation in said opposite direction.

Therefore, the present invention contemplates a base board, or material supporting board, 15 on the upper surface of which is disposed the material 16 to be cut by the tool of the present invention. The cutting board 15, see FIG. 3, is provided at a suitable point in the area of the board with a hollow metal ferrule 17 and the positioning flange 18 of said ferrule underlying the material 16 which is to be cut.

The hand tool comprises a body 19 having a head or cutting end indicated in general by the reference numeral 20. The said cutting end 20 of the hand tool body has formed therein an elongated, though relatively narrow, apeture 21 whose lateral sides 22 and 23, while substantially parallel to one another, are angularly related to a vertical axis through the said cutting tool body portion 19, as disclosed most clearly in FIGS. 4 and 5.

The aperture 21 is adapted to have disposed therein the cutter blade indicated in its entirety by the reference numeral 24. The said blade 24 is quite long as compared to its width with said blade including a top or handle portion 25 from which extends the cutting portion 26 of the blade. The blade cutting or body portion 26 has extending for its length, and substantially parallel with a longitudinal axis through the blade as a whole with a keen edge 27 which, at its upper end, is connected with the handle or blade positioning portion 25, while the other end of the said keen edge 27 terminates in a rounded point 28. The blade body portion 26 has its other longitudinal side provided with two portions angularly related to one another and with said portions being formed by a keen lower or bottom portion 29 extending from the rounded point 28 in an obtuse or sharp angle and with the other portion edge 30 of the blade longitudinal edge extending, substantially at right angle to the keen lower or body portion, with said blade edge portion 30 blunt or flat. The said bottom portion 29 and substantially vertical portion 30 being connected with one another through, as noted above, a relatively right angle and with said portion or edge 30 terminating in a narrow neck through relatively long portion 31.

In operation the said cutting blade 24 is adapted to be disposed in the body angled aperture 21 to have a portion of the blade keen edges 27 and 29, including the rounded point 28, therebewteen, disposed below the lower bottom or base surface of the cutter body 19. The said cutter blade 24 is retained in this position by a clamp block 33 in the angled aperture 21 and with said clamp block being actuated to a clamping position by a thumb screw 34 threaded through a metallic sleeve 35 disposed in the end of the body 19. It should be here noted that the reason for the threaded metallic sleeve 35 is that the hand tool portion 19 is molded of a resin or plastic material, which, while having considerable inherent strength, cannot be threaded to receive the thumb clamping screw 34 and react to the necessary block and blade clamping pressure. In this connection also, the said head or cutting end of the tool body portion 19 carries an axially movable headed pin 36 which passes freely through an opening in the front end of the body portion to be embedded in the clamp plate 33 to prevent the said clamp plate from inadvertently dropping from the said angled aperture 21.

The body 19 of the hand tool is provided upwardly from its lower bottom or base surface with an elongated slot 37 having a bottom or shoulder 37a while the said body portion 19 upwardly of the said bottom or base 37a of the slot 37 is provided with an elongated aperture 38, that breaks through the upper surface of the tool body.

Disposed within the slot 37 is a block 39 having a height equal to the depth of the said slot 37 with said block against the slot bottom and having extending vertically thereof near its front end, as seen in FIG. 3, a metallic sleeve 40 through which extends a centering pin 41, for a purpose which will presently be made clear.

The block 39 has secured therein to upstand therefrom a threaded stud 42 which projects upwardly through the slot 37 and above the top surface of the body to be received in a threaded metallic sleeve 43 of a clamp nut 44. For a purpose, again to be subsequently made clear, there is disposed between the above noted upper surface of the body 19 and the clamping or bottom surface of the nut 44 a plurality of spacing members or washers 45 which for convenience may have an exterior diameter substantially equal to that of the sleeve portion of the nut 44.

In practice, the nut 44 through the stud 42 is adapted to secure the block 39 in definite adjustable positions throughout the length of the body portion with respect to the cutting edge 27–28–29 of the blade 24. With the parts as above described and illustrated in FIG. 3 the tool is arranged for cutting discs from the material 16 on the material supporting board 15. In order to do this the centering pin 41 has its body portion 46 in the said block sleeve 44 and of a length to extend from the upper surface of the cutting board 15 to the under surface of the lowermost washer or spacing control member 45; that is, of a length equal to the height of the tool body portion 19 from its lower surface to its upper surface. The centering pin 41 has projecting below its body portion 46 a reduced pointed portion 47 of a diameter to extend into the ferrule aperture and with said pointed portion of a length not to project below the said cutting board 15.

It is believed obvious from FIGS. 1 and 3 that the cutting tool body portion 19 is actuable on the axis on the centering pin 41 for causing the blade 24 to move in a circle around the axis of the cutting pin to produce the above mentioned discs.

With the cutting blade in the position shown in FIGS. 1 and 5 and the cutter body actuated in the direction of the arrow 48, associated with FIG. 5, the blade keen edge 29 and keen rounded point 28 will cut to the depth of the material 16 as shown. After a complete cutting circle or cycle has been effected and the material cut to the depth shown in FIG. 5 the cutting tool may be reversed and moved in the direction of the arrow 49 associated with FIG. 4 which will then cut the relatively thin portion of the material left so that the disc is then completely cut from the body of the material 16.

It should be noted however that the cutting blade 24 may be lowered to a position which when moving in the direction of the arrow 48 will completely sever the disc in one, or two, or more, rotations around the axis of the pin 41 and thereby fully and completely cut the disc from the material without reversing the direction of actuation or rotation of the cutter body on the axis of pin 41.

In order to cut strips parallel with a previously formed edge the clamp nut 44 is removed from the stud 42 and whereupon the pin block 39 is removed from the slot 37 and with it the screw stud 42 from the elongated aperture 38. The washers are then mounted on the screw stud above the block 39 and whereupon the said block is returned to the slot 37 with the washer between the upper surface of the block 39 and the bottom or shoulder 37a of the slot 37, as clearly illustrated in FIGS. 7 and 9, at the same time the clamp block 39 is reversed in the slot 37 to bring into play the relatively flat side 50 of the block again as seen in FIGS. 6, 7, 8 and 9. This straight or flat side 50 is used as a guide for effecting the removal of a strip from the material equal to the spacing of the block side 50 and keen edge of the cutting blade, as seen in each of FIGS. 6, 7, 8 and 9.

In the event the material being cut is thin, by comparison with the thickness of the spacing collars or washers 45, the said material is positioned to have its edge on and parallel with the edge of the cutting board, as seen in FIGS. 6 and 7, so that the said edge of the cutting board is used as the guide for the tool and particularly the keen edge of the blade.

In the event the material from which a strip is being cut is as thick or thicker than the spacing collars 45 then the material may be positioned with its edge inwardly of the edge of the cutting board and with this edge engaged by the flat face 50 of the block 39 engaging the edge of the material being cut all as clearly illustrated in FIGS. 8 and 9.

Again, in cutting strips and by properly clamping the blade 24 the tool may be actuated for the full length of the strip being cut by moving same in the direction of the arrow 48 and thereby causing a major cutting into the material. Upon reaching the remote end of the cut the tool is actuated toward the starting end of the cut in the direction of the arrow 49 for thereby again shifting the cutting blade to have its rounded point 28 and keen edge of the cutter blade to be below the lower surface of the material for completely severing the material 16 into a strip from the remaining body portion of the said material.

From the foregoing it will now be apparent that the said hand cutting tool is actuatable in opposite directions for automatically reversing the cutting blade in the slot for effecting a complete cutting through the material to obtain either a rounded washer, gasket, or the like, with a hole centrally thereof or for providing strips having their edges parallel with one another, whether said edges are in parallel planes or undulated with respect to a plane.

It should be noted that whether the cutter is actuated in the direction of the arrow 48 or the arrow 49, a substantially vertical cutting edge is presented to the work and thereby effecting the most economical cutting operation possible.

What is claimed is:

1. In a cutting tool of the class described for cutting circles and strips from flat material comprising a body member having a relatively flat bottom surface disposed on the upper surface of the material being cut, a passageway extending at an acute angle through the forward end of the body member having the sides of said passageway parallel for a cutting blade, a cutting blade in said body member passageway having a body portion relatively narrow by comparison with its length and with an edge on each side of said cutting blade body portion keen for a distance upwardly of the lower end of the blade, one of said keen cutting edges of the body portion being substantially straight and parallel with the longitudinal axis of the blade, the other edge of the cutting blade being upwardly, outwardly, angularly disposed to the first keen edge and axis of the blade, said cutting blade at the upper end of the angular keen edge having a recess extending toward the longitudinal axis of the blade with said recess having a side angularly related to the angular keen edge of the cutting blade, said body member angular passageway having its side spaced from one another a distance somewhat greater than the effective width of the cutting blade, said cutting blade having the angular side of its recess substantially adjacent one of the angular passageway sides to dispose its keen edge which is substantially parallel to the blade axis normal to the said bottom surface of the cutter body and said cutter blade being adapted to be shifted, without removing the cutter blade from the body passageway, in a plane including itself to have said keen edge which is substantially parallel to the blade axis substantially against the other side of the angular passageway to dispose said angular keen edge of the cutter blade normal to the flat bottom surface of the cutter body portion, and means carried by said forward end of the body member for securing the cutting blade in each position.

2. In a cutting tool of the class described for cutting circles and strips from flat material as set forth in claim 1 characterized by, said angularly related keen edges of the body portion sides terminating in a connecting keen rounded corner and wherefore said blade will cut when moved in either direction through the movement of the said carrying body member.

3. In a cutting tool of the class described for cutting circles and strips from flat material as set forth in claim 1 characterized by, said angularly related keen edges of the body portion sides terminating in a connecting keen rounded corner and wherefore said blade will cut when moved in either direction through the movement of the said carrying body member, and a head at the upper end of the blade and projecting upwardly of the cutter body and blade body portion for manipulation to operatively relate either keen edge to the flat material depending upon the direction of movement of the said body member.

4. In a cutting tool of the class described for cutting circles and strips from flat material as set forth in claim 1 characterized by, said means for securing the blade in its passageway being such that pressure on the blade when the cutter body is moved in one direction cut through itse appropriate keen edge while reverse movement of said cutter body will automatically shift the said blade in its passageway for effecting its cutting action in said reverse direction.

References Cited

UNITED STATES PATENTS

| | | | |
|---|---|---|---|
| 1,537,308 | 5/1925 | Jenner | 30—353 X |
| 2,368,908 | 2/1945 | Witter et al. | 30—300 |
| 2,517,840 | 8/1950 | Chatlos | 30—353 X |
| 2,986,814 | 6/1961 | Brinkman | 30—300 |
| 3,057,065 | 10/1962 | Zimmerman | 30—310 X |

JAMES L. JONES, Jr., *Primary Examiner.*

U.S. Cl. X.R.

30—310